(12) United States Patent
Ghim et al.

(10) Patent No.: US 12,474,165 B2
(45) Date of Patent: Nov. 18, 2025

(54) CALIBRATION METHOD FOR DEFLECTOMETRY METHOD, FOR IMPROVING MEASUREMENT ACCURACY

(71) Applicant: KOREA RESEARCH INSTITUTE OF STANDARD AND SCIENCE, Daejeon (KR)

(72) Inventors: Young-Sik Ghim, Sejong (KR); The Manh Nguyen, Daejeon (KR); Hyug-Gyo Rhee, Deajeon (KR)

(73) Assignee: KOREA RESEARCH INSTITUTE OF STANDARD AND SCIENCE, Daejeon (KR)

( * ) Notice: Subject to any disclaimer, the term of this patent is extended or adjusted under 35 U.S.C. 154(b) by 263 days.

(21) Appl. No.: 18/352,392

(22) Filed: Jul. 14, 2023

(65) Prior Publication Data
US 2023/0358531 A1   Nov. 9, 2023

Related U.S. Application Data

(63) Continuation of application No. PCT/KR2021/008408, filed on Jul. 2, 2021.

(30) Foreign Application Priority Data

Mar. 5, 2021 (KR) .......................... 10-2021-0029569

(51) Int. Cl.
  *G01B 11/25* (2006.01)
  *G06T 7/50* (2017.01)
  *G06T 17/00* (2006.01)

(52) U.S. Cl.
  CPC ...... *G01B 11/2504* (2013.01); *G01B 11/2513* (2013.01); *G06T 7/50* (2017.01); *G06T 17/00* (2013.01); *G06T 2200/04* (2013.01)

(58) Field of Classification Search
  None
  See application file for complete search history.

(56) References Cited

U.S. PATENT DOCUMENTS

2022/0221270 A1*  7/2022  Zuo ..................... G01B 11/2513

FOREIGN PATENT DOCUMENTS

| JP | 2005-300169 A | 10/2005 |
| KR | 10-2002-0082738 A | 10/2002 |
| KR | 10-2015-0119770 A | 10/2015 |
| KR | 10-1955847 B1 | 3/2019 |
| KR | 10-2021-0002821 A | 1/2021 |

* cited by examiner

*Primary Examiner* — Lennin R Rodriguezgonzalez
(74) *Attorney, Agent, or Firm* — NKL Law; Jae Youn Kim

(57) ABSTRACT

The present disclosure relates to a method that enables easy and fast calibration of deflectometry for measuring and analyzing the shape of a measurement target with a freeform surface in which the phase of the reference plane mirror, the geometric position information among the components (screen, reference plane mirror, detector) and $\beta$ from the phase offset are measured are calibrated in the calibration step before the shape measurement of the measurement object; the phase of the measurement target is measured; $\alpha$ is calibrated using $\beta$ as a basis to compute the gradient components; and the X-direction phase (X-direction gradient component) and Y-direction phase (Y-direction gradient component) are swiftly and accurately computed through a novel algorithm.

16 Claims, 5 Drawing Sheets

CALIBRATION METHOD FOR DEFLECTOMETRY METHOD, FOR IMPROVING MEASUREMENT ACCURACY

CROSS-REFERENCE TO RELATED APPLICATIONS

This application is a continuation application of PCT/KR2021/008408, filed on Jul. 2, 2021, the contents of which are incorporated herein by reference in their entirety.

BACKGROUND

Technical Field

The present disclosure relates to a calibration method of deflectometry for improving measurement accuracy.

RELATED ART

A freeform surface refers to an arbitrary surface that exhibits asymmetry with respect to any axis. The key components of recent state-of-the-art optical devices such as smart glasses and head-mounted displays (HMDs) are all comprised of freeform surfaces. Extensive research is being conducted worldwide due to the fact that these freeform surfaces not only exceed the limitations of traditional spherical or aspherical optics in terms of optical performance but also simultaneously fulfill design requirements. The deflectometry a prominent technique capable of measuring the three-dimensional shape of such freeform surfaces. Unlike conventional interferometry, it enables three-dimensional shape measurement of the target object without the need for a separate reference surface. As a result, it is gaining recognition as a next-generation apparatus for three-dimensional shape measurement.

The fundamental principle of the deflectometry measure the variations in surface slope by illuminating the surface of the target object, which is to be measured, with a fringe pattern having a periodic pattern and then analyzing the phase of the deformed pattern caused by the shape of the target object. That is, under the assumption that the shape of the target object to be measured is described as $z=z(x, y)$, the measurements obtained through the deflectometry are components of the x axis direction gradient ($\partial z/\partial x$) and the y axis direction gradient ($\partial z/\partial y$) in accordance with the direction of the incident pattern. Therefore, by integrating the two gradient components in the x and y directions obtained from the measured phase, it is possible to restore and obtain a three-dimensional shape of the target object.

At this time, in order to obtain the x axis direction gradient component and y axis direction gradient component from the measured phase, a complex system calibration method becomes necessary. It is crucial to have an accurate calibration method that accurately measure the geometric positions of each component that constitutes the system, such as the position at which each pixel of the stripe pattern projected on the screen is interrogated and reflected from the desired location on the specimen, as well as the position of the camera used to capture it.

SUMMARY

Technical Problem

Therefore, the present disclosure is contrived to solve conventional problems as described above. According to an embodiment of the present disclosure, it aims to provide a method that enables easy and fast calibration of deflectometry for measuring and analyzing the shape of a measurement target with a freeform surface in which the phase of the reference plane mirror, the geometric position information among the components (screen, reference plane mirror, detector) and $\beta$ from the phase offset are measured are calibrated in the calibration step before the shape measurement of the measurement object; the phase of the measurement target is measured; $\alpha$ is calibrated using $\beta$ as a basis to compute the gradient components; and the X-direction phase (X-direction gradient component) and Y-direction phase (Y-direction gradient component) are swiftly and accurately computed through a novel algorithm.

Meanwhile, technical objects to be achieved in the present invention are not limited to the aforementioned technical objects, and other technical objects, which are not mentioned above, will be apparently understood to a person having ordinary skill in the art from the following description.

Technical Solution

According to a first aspect of the present disclosure, it can be achieved by a deflectometry system for improving measurement accuracy in a shape measurement system, the deflectometry system for improving measurement accuracy including: a reference plane mirror that is positioned on an X-Y plane and has a plane shape parallel to the X-Y plane, in an X-Y-Z coordinated system; a measurement object that is positioned on the X-Y plane; a screen that generates a pattern and projects the pattern onto the measurement object or the reference plane mirror; a detector that obtains an image of a deformed pattern reflected from the measurement object and an image of a pattern reflected from the reference plane mirror; a phase acquisition portion that obtains a phase of the measurement object and obtains a phase of the reference plane mirror; a gradient calculation portion that computes an X-direction gradient component and computes a Y-direction gradient component; and an analysis unit that analyzes a three-dimensional shape of the measurement object based on the X-direction gradient component and the Y-direction gradient component, wherein prior to measuring the phase of the measurement object, $\beta$ is calibrated based on the phase of the reference plane mirror; and after measuring the phase of the measurement object, $\alpha$ is calibrated based on the $\beta$ to compute the gradient component.

The X-direction gradient component and the Y-direction gradient component are computed based on the following equation 4:

$$x_{slope} = \pm\frac{1}{\sqrt{1+k_s^2+1/\alpha_x^2}} \pm \frac{1}{\sqrt{1+k_3^2+1/\gamma_x^2}} \cdot y_{slope} =$$
$$\frac{1}{\sqrt{\alpha_x^3+\alpha_y^2+1}} + \frac{1}{\sqrt{\gamma_x^3+\gamma_y^2+1}}$$

$$\pm\frac{1}{\sqrt{1+1/k_s^2+1/\alpha_y^2}} \pm \frac{1}{\sqrt{1+1/k_2^2+1/\gamma_3^2}}$$
$$\frac{1}{\sqrt{\alpha_y^2+\alpha_y^2+1}} + \frac{1}{\sqrt{\gamma_x^2+\gamma_y^2+1}}$$

[Equation 4]

The calibration of $\beta$ is calculated from the phase of the reference plane mirror, geometric position information among the screen, the reference plane mirror and the director, and phase offsets.

Further, the geometric position information among the respective components (screen, reference plane mirror, director) has a Z axis direction distance ($Z_{m2s}$) between the screen and the reference plane mirror, Z axis direction distance ($Z_{c2s}$) between the screen and the detector, an X axis direction distance ($X_c$), and a Y axis direction distance ($Y_c$).

When marking a bright dot on a specific screen pixel position $S(X_{sp}, Y_{sp})$, followed by: representing each phase of this pixel in the X axis direction and Y axis direction as $\varphi_{spx}$, $\varphi_{spy}$, respectively; storing an image of the bright dot reflected onto the reference plane mirror through the detector; determining and identifying a position of the bright dot within the detector image; and representing a phase at this moment as $\varphi_{cpx}$, $\varphi_{cpy}$, a phase offset of the X axis direction and a phase offset of the Y axis direction are calculated by the following equations 19 and 20:

$$\varphi_{x\_offset} = \varphi_{spx} - \varphi_{cpx} = 2\pi f_x x_{cp} - \varphi_{cpx} \qquad \text{[Equation 19]}$$

$$\varphi_{y\_offset} = \varphi_{spy} - \varphi_{cpy} = 2\pi f_y x_{cp} - \varphi_{cpy} \qquad \text{[Equation 20]}$$

Further, phases of X-direction and Y-direction, which are obtained when positioning the reference plane mirror at a position of the measurement object based on the phase offset of the X axis direction and the phase offset of Y axis direction, are calculated by the following equation 21:

$$\varphi_{bx} = \frac{x_b 2\pi p_x}{s_p X_{screen}} - \varphi_{x\_offset}, \; \varphi_{by} = \frac{y_b 2\pi p_y}{s_p Y_{screen}} - \varphi_{y\_offset} \qquad \text{[Equation 21]}$$

Further, $\beta_x$ and $\beta_y$ are calculated by the following equations 17 and 18:

$$\beta_x = \frac{x_c - x_{bo}}{2z_{m2s} - z_{c2s}}, \; \beta_y = \frac{y_c - y_{bo}}{2z_{m2s} - z_{c2s}} \qquad \text{[Equation 17]}$$

$$x_{bo} = \frac{s_p(\varphi_{box} + \varphi_{x\_offset}) X_{screen}}{2\pi p_x}, \qquad \text{[Equation 18]}$$

$$y_{bo} = \frac{s_p(\varphi_{boy} + \varphi_{y\_offset}) Y_{screen}}{2\pi p_y}$$

Further, $\alpha_x$ and $\alpha_y$ are calculated by the following equations 15 and 16:

$$\alpha_x = \beta_x + \frac{x_a - x_b}{z_m - z_{m2s}}, \; \alpha_y = \beta_y + \frac{y_a - y_b}{z_m - z_{m2s}} \qquad \text{[Equation 15]}$$

$$x_a - x_b = \frac{s_P(\varphi_{ax} - \varphi_{bx}) X_{screen}}{2\pi p_x}, \qquad \text{[Equation 16]}$$

$$y_a - y_b = \frac{s_P(\varphi_{ay} - \varphi_{by}) Y_{screen}}{2\pi p_y}$$

A converged value of $z_m$ is measured by repeating the following process, which involves setting the initial value of $z_m$ in Equation 15 to 0, calculating $\alpha_x$ and $\alpha_y$, analyzing the gradient component and a three-dimensional shape of the measurement object, and then calculating $z_m$.

According to a second aspect of the present disclosure, it can be achieved by a calibration method of deflectometry for improving measurement accuracy in a shape measurement method, the calibration method of deflectometry for improving measurement accuracy including steps of: S1: in a screen X-Y-Z coordinate system that generates a pattern, the pattern is projected onto a reference plane mirror positioned on the X-Y plane, a detector obtains an image of a deformed pattern reflected from the reference plane mirror, and then a phase acquisition portion obtains a phase of the reference plane mirror; S2: the phase acquisition portion calibrates β based on the phase of the reference plane mirror as a basis; S3: a measurement object is position on the X-Y plane, a screen projects the pattern onto the measurement object, and the detector obtains an image of a deformed pattern reflected from the measurement object; S4: α is calibrated based on the β; S5: a gradient calculation portion computes an X-direction gradient component and a Y-direction gradient component; and S6: an analysis unit analyzes a three-dimensional shape of the measurement specimen based on the X-direction gradient component and the Y-direction gradient component.

In S5, the X-direction gradient component and the Y-direction gradient component are computed by the following equation 4:

$$x_{slope} = \frac{\pm \frac{1}{\sqrt{1 + k_s^2 + 1/\alpha_x^2}} \pm \frac{1}{\sqrt{1 + k_s^2 + 1/\gamma_x^2}}}{\frac{1}{\sqrt{\alpha_x^2 + \alpha_y^2 + 1}} + \frac{1}{\sqrt{\gamma_x^2 + \gamma_y^2 + 1}}}, \qquad \text{[Equation 4]}$$

$$y_{slope} = \frac{\pm \frac{1}{\sqrt{1 + 1/k_s^2 + 1/\alpha_y^2}} \pm \frac{1}{\sqrt{1 + 1/k_s^2 + 1/\gamma_y^2}}}{\frac{1}{\sqrt{\alpha_x^2 + \alpha_y^2 + 1}} + \frac{1}{\sqrt{\gamma_x^2 + \gamma_y^2 + 1}}}$$

Further, in S2, a phase of the reference plane mirror, calibration of the β is calculated from geometric position information among respective components (screen, reference plane mirror, detector) and phase offsets. The geometric position information among the respective components (screen, reference plane mirror, detector) has a Z axis direction distance ($Z_{m2s}$) between the screen and the reference plane mirror, Z axis direction distance ($Z_{c2s}$) between the screen and the detector, an X axis direction distance ($X_c$), and a Y axis direction distance ($Y_c$). When marking a bright dot on a specific screen pixel position $S(X_{sp}, Y_{sp})$, followed by: representing each phase of this pixel in the X axis direction and Y axis direction as $\varphi_{spx}$, $\varphi_{spy}$, respectively; storing an image of the bright dot reflected onto the reference plane mirror through the detector; determining and identifying a position of the bright dot within the detector image; and representing a phase at this moment as $\varphi_{cpx}$, $\varphi_{cpy}$, a phase offset of the X axis direction and a phase offset of the Y axis direction are calculated by the following equations 19 and 20:

$$\varphi_{x\_offset} = \varphi_{spx} - \varphi_{cpx} = 2\pi f_x x_{cp} - \varphi_{cpx} \qquad \text{[Equation 19]}$$

$$\varphi_{y\_offset} = \varphi_{spy} - \varphi_{cpy} = 2\pi f_y x_{cp} - \varphi_{cpy} \qquad \text{[Equation 20]}$$

Further, phases of X direction and Y direction, which are obtained when positioning the reference plane mirror at a position of the measurement object based on the phase offset of the Y axis direction and the offset of Y axis direction, are calculated by the following equation 21:

$$\varphi_{bx} = \frac{x_b 2\pi p_x}{s_p X_{screen}} - \varphi_{x\_offset}, \; \varphi_{by} = \frac{y_b 2\pi p_y}{s_p Y_{screen}} - \varphi_{y\_offset} \qquad \text{[Equation 21]}$$

$\beta_x$ and $\beta_y$ are calculated by the following equations 17 and 18:

$$\beta_x = \frac{x_c - x_{bo}}{2z_{m2s} - z_{c2s}}, \beta_y = \frac{y_c - y_{bo}}{2z_{m2s} - z_{c2s}} \quad \text{[Equation 17]}$$

$$x_{bo} = \frac{s_p(\varphi_{box} + \varphi_{x\_offset})X_{screen}}{2\pi p_x}, \quad \text{[Equation 18]}$$

$$y_{bo} = \frac{s_p(\varphi_{boy} + \varphi_{y\_offset})Y_{screen}}{2\pi p_y}$$

In S4, $\alpha_x$ and $\alpha_y$ are calculated by the following equations 15 and 16:

$$\alpha_x = \beta_x + \frac{x_a - x_b}{z_m - z_{m2s}}, \alpha_y = \beta_y + \frac{y_a - y_b}{z_m - z_{m2s}} \quad \text{[Equation 15]}$$

$$x_a - x_b = \frac{s_p(\varphi_{ax} - \varphi_{bx})X_{screen}}{2\pi p_x}, \quad \text{[Equation 16]}$$

$$y_a - y_b = \frac{s_p(\varphi_{ay} - \varphi_{by})Y_{screen}}{2\pi p_y}$$

Further, a converged value of $z_m$ is measured by repeating the following process, which involves setting the initial value of $z_m$ in Equation 15 to 0, calculating $\alpha_x$ and $\alpha_y$, measuring $z_m$ via S5 and S7, and then recalculating $\alpha_x$ and $\alpha_y$.

According to a third aspect of the present disclosure, it can be achieved by a recording medium in which a computer program that performs a calibration method according to the aforementioned second aspect is recorded.

Advantageous Effects

According to a calibration method of deflectometry for improving measurement accuracy in accordance of an embodiment of the present disclosure, it is capable of measuring and analyzing the shape of a measurement target with a freeform surface in which the phase of the reference plane mirror, the geometric position information among the components (screen, reference plane mirror, detector) and β from the phase offset are measured are calibrated in the calibration step before the shape measurement of the measurement object; the phase of the measurement target is measured; α is calibrated using β as a basis to compute the gradient components; and the X-direction phase (X-direction gradient component) and Y-direction phase (Y-direction gradient component) are swiftly and accurately computed through a novel algorithm.

Meanwhile, advantageous effects to be obtained in the present disclosure are not limited to the aforementioned effects, and other effects, which are not mentioned above, will be apparently understood to a person having ordinary skill in the art from the following description.

BRIEF DESCRIPTION OF THE DRAWINGS

The accompanying drawings of this specification exemplify a preferred embodiment of the present disclosure, the spirit of the present disclosure will be more clearly understood from the following detailed description taken in conjunction with the accompanying drawings, and thus it will be understood that the present disclosure is not limited to only contents illustrated in the accompanying drawings.

REFERENCE NUMBERS

1: Reference plane mirror
2: Measurement object
10: Screen
20: Detector (Camera)
100: Shape measurement system

DETAILED DESCRIPTION

Best Mode

Hereinafter, a calibration method of deflectometry for improving measurement accuracy will be described.

A deflectometry system consists of a screen 10 that projects a pattern generated from a digital computer and a camera 20 that captures an image of a deformed pattern according to a shape of a measurement object. An arbitrary pattern is generated using the digital computer. The generated pattern is then projected onto a measurement object using a separate screen 10. The camera 20 captures and stores an image of a deformed pattern according to a shape of the measurement object.

Figure 1:
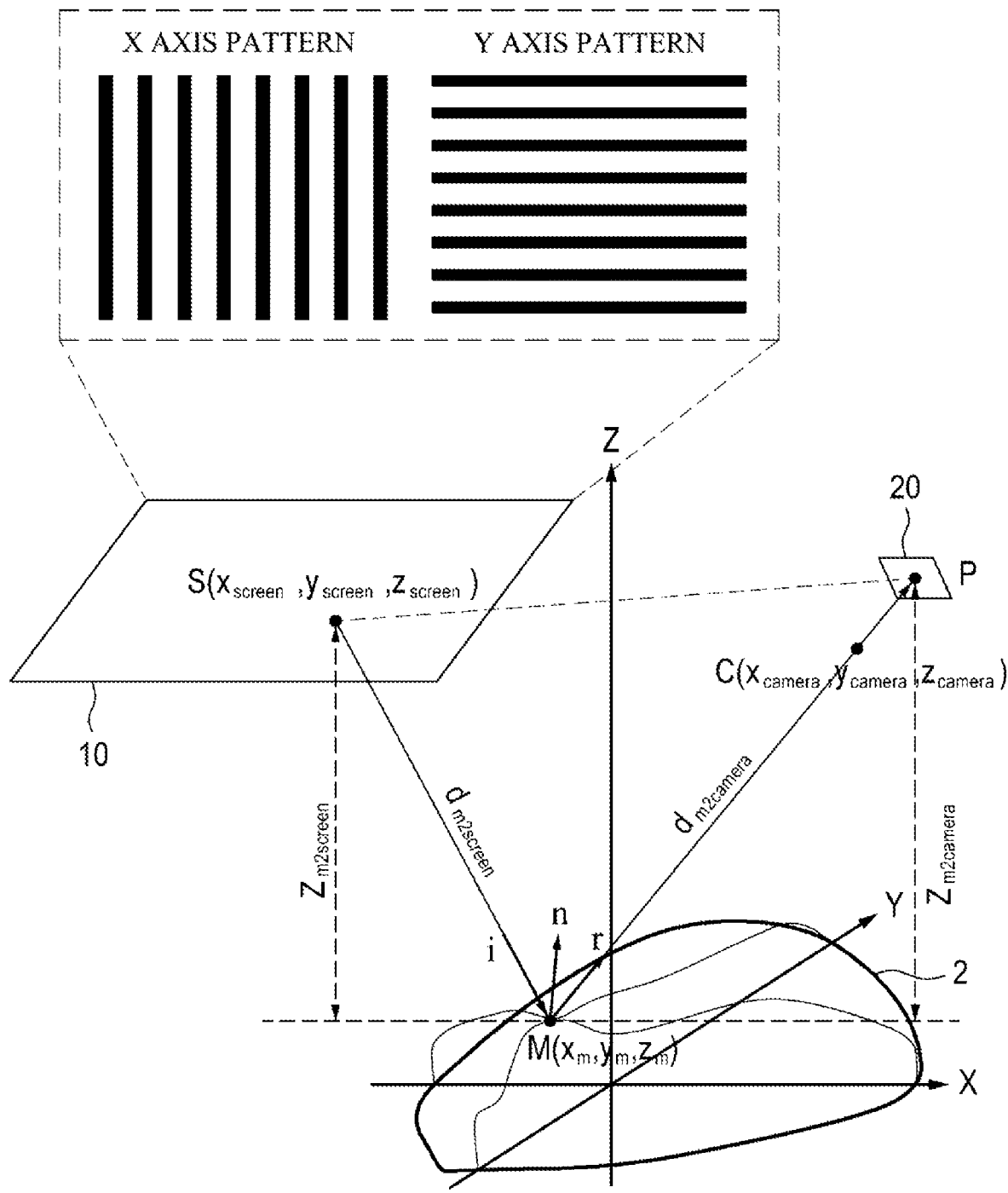
FIG. 1 shows a schematic view of a typical deflectometry system.

FIG. 1 shows a schematic view of a typical deflectometry system. That is, FIG. 1 illustrates a typical deflectometry system 100 that includes a screen 10 and a camera 20. The screen 10 usually employs an LCD monitor. In the conventional deflectometry system, an LCD monitor projects a grid pattern in X axis and Y axis directions on a measurement object. The camera captures and stores an image of a reflected pattern that was distorted depending on a shape of the measurement object.

In other words, the deflectometry system 100 consists of: a reference plane mirror 1 that is positioned on an X-Y plane and has a plane shape parallel to the X-Y plane, in an X-Y-Z coordinated system; a measurement object that is positioned on the X-Y plane; a screen 10 that generates a pattern and projects the pattern onto the measurement object or the reference plane mirror 1;

a detector 20 that obtains an image of a deformed pattern reflected from the measurement object and an image of a pattern reflected from the reference plane mirror 1; a phase acquisition portion that obtains a phase of the measurement object and obtains a phase of the reference plane mirror 1; a gradient calculation portion that computes an X-direction gradient component and computes a Y-direction gradient component; and an analysis unit that analyzes a three-dimensional shape of the measurement object based on the X-direction gradient component and the Y-direction gradient component.

Further, as described later, according to an embodiment of the present disclosure, prior to measuring the phase of the measurement object, β is calibrated based on the phase of the reference plane mirror 1. After measuring the phase of the measurement object, α is calibrated based on the β to compute the gradient component.

Using the phase shifting method, the position relationship between each detector 20 (hereinafter, referred to as a camera) pixel and screen 10 (LCD monitor) pixel is set. Then, after precisely calibrating the geometric position of the screen 10, the camera 20 and the measurement object, a three-dimensional shape of the measurement object is obtained. SCOTS (Software Configurable Optical Test System) is well-known for its simple system configuration and precise system calibration method, among the phase shifting deflectometry (Su, P., et al., Software configurable optical test system: a computerized reverse Hartmann test. Appl. Opt, 2010. 49(23): p. 4404-4412).

In SCOTS, X-direction and Y-direction surface slopes at an arbitrary position $M(x_m, y_m, z_m)$ are calculated using the following equation 1.

$$x_{slope} = \frac{\frac{x_m - x_{screen}}{d_{m2screen}} + \frac{x_m - x - camera}{d_{m2camera}}}{\frac{z_{screen} - z_m}{d_{m2screen}} + \frac{z_{camera} - z_m}{d_{m2camera}}}, \quad \text{[Equation 1]}$$

$$y_{slope} = \frac{\frac{y_m - y_{screen}}{d_{m2screen}} + \frac{y_m - y_{camera}}{d_{m2camera}}}{\frac{z_{screen} - z_m}{d_{m2screen}} + \frac{z_{camera} - z_m}{d_{m2camera}}}$$

Herein, $S(x_{screen}, y_{screen}, z_{screen})$ and $C(x_{camera}, y_{camera}, z_{camera})$ represent pixel positions of the screen 10 and the camera 20 respectively. A pattern projected from the position of the screen 10 S is reflected from the position of the measurement object M and passes through the center position of the camera 20 C. At this time, $d_{m2screen}$ and $d_{m2camera}$ represent distances from M to S and M to C respectively. $z_{m2screen}$ and $z_{m2camera}$ represent vertical distances along z axis direction from the screen 10 and the camera 20 to the measurement object M. $z_m$ represents a surface height at the position of the measurement object M. Equation 1 is represented by the following equations 2 and 3.

$$x_{slope} = \frac{\frac{x_m - x_{screen}}{\sqrt{(x_m - x_{screen})^2 + (y_m - y_{screen})^2 + (z_m - z_{screen})^2}} + \frac{x_m - x_{camera}}{\sqrt{(x_m - x_{camera})^2 + (y_m - y_{camera})^2 + (z_m - z_{camera})^2}}}{\frac{z_{screen} - z - m}{\sqrt{(x_m - x_{screen})^2 + (y_m - y_{screen})^2 + (z_m - z_{screen})^2}} + \frac{z_{camera} - z - m}{\sqrt{(x_m - x_{camera})^2 + (y_m - y_{camera})^2 + (z_m - z_{camera})^2}}} \quad \text{[Equation 2]}$$

$$y_{slope} = \frac{\frac{y_m - y_{screen}}{\sqrt{(x_m - x_{screen})^2 + (y_m - y_{screen})^2 + (z_m - z_{screen})^2}} + \frac{y_m - y_{camera}}{\sqrt{(x_m - x_{camera})^2 + (y_m - y_{camera})^2 + (z_m - z_{camera})^2}}}{\frac{z_{screen} - z_m}{\sqrt{(x_m - x_{screen})^2 + (y_m - y_{screen})^2 + (z_m - z_{screen})^2}} + \frac{z_{camera} - z_m}{\sqrt{(x_m - x_{camera})^2 + (y_m - y_{camera})^2 + (z_m - z_{camera})^2}}} \quad \text{[Equation 3]}$$

Herein, $$d_{m2xrun} = \sqrt{(x_m - x_{screen})^2 + (y_m - y_{screen})^2 + (z_m - z_{screen})^2},$$

$$d_{m2camera} = \sqrt{(x_m - x_{camera})^2 + (y_m - y_{camera})^2 + (z_m - z_{camera})^2}$$

Equations 2 and 3 are represented more concisely by the following equation 4.

$$x_{slope} = \frac{\pm\frac{1}{\sqrt{1 + k_s^2 + 1/\alpha_x^2}} \pm \frac{1}{\sqrt{1 + k_v^2 + 1/\gamma_x^2}}}{\frac{1}{\sqrt{\alpha_{x2} + \alpha_y^2 + 1}} + \frac{1}{\sqrt{\gamma_v^2 - \gamma_y^2 + 1}}}, \quad \text{[Equation 4]}$$

$$y_{slope} = \frac{\pm\frac{1}{\sqrt{1 + 1/k_z^2 + 1/\alpha_y^2}} \pm \frac{1}{\sqrt{1 + 1/k_x^2 + 1/\gamma_y^2}}}{\frac{1}{\sqrt{\alpha_x^2 + \alpha_y^2 + 1}} + \frac{1}{\sqrt{\gamma_x^2 + \gamma_y^2 + 1}}}$$

In equation 4,
[Equation 5] is as follows, $$\alpha_x = \frac{x_m - x_{screen}}{z_{screen} - z_m}, \alpha_y = \frac{y_m - y_{screen}}{z_{screen} - z_m},$$

$$\gamma_x = \frac{x_m - x_{camera}}{z_{camera} - z_m}, \gamma_y = \frac{y_m - y_{camera}}{z_{camera} - z_m}$$

$$k_s = \frac{y_m - y_{screen}}{x_m - x_{screen}}, k_c = \frac{y_m - y_{camera}}{x_m - x_{camera}}.,$$

and
[Equation 6] derived from equation 5 is as follows, $$k_s = \frac{\alpha_y}{\alpha_x}, k_c = \frac{\gamma_y}{\gamma_x}$$

By simplifying the mathematical expression of equation 1, the surface slope equation can be efficiently using only four parameters $\alpha_x$, $\alpha_y$, $\gamma_x$, and $\gamma_y$, as shown in equation 4.

Figure 2:
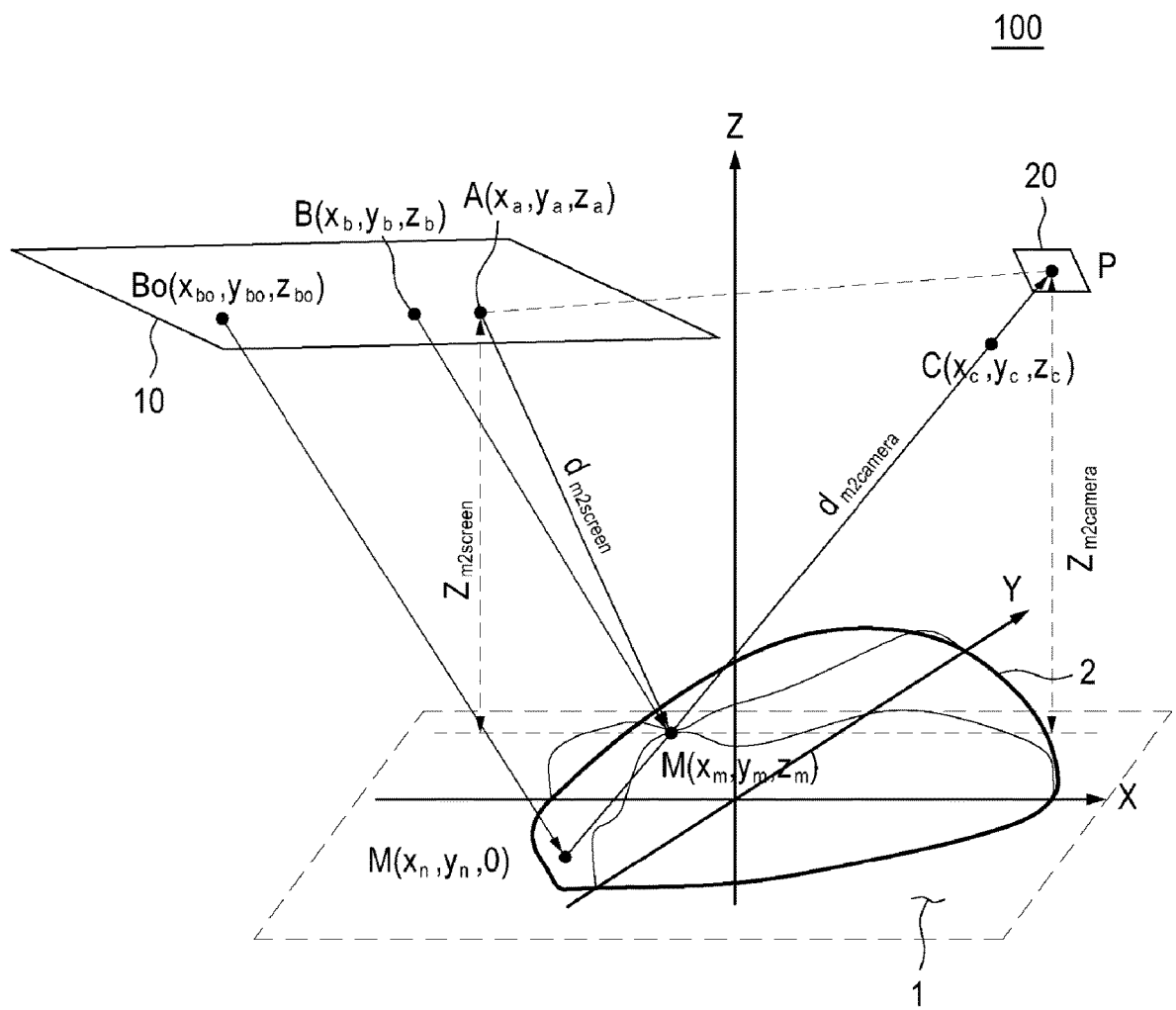
FIG. 2 shows a schematic view of a deflectometry system for improving measurement accuracy according to the present disclosure.

FIG. 2 shows a schematic view of a deflectometry system for improving measurement accuracy according to the present disclosure. That is, in order to provide a more detailed explanation of a system calibration method according to an embodiment of the present disclosure, a schematic view of the system is presented, as shown in FIG. 2.

In order to calibrate the system 100, a separate reference plane mirror 1 is used. A screen used for projecting a pattern is positioned parallel to the reference plane mirror 1. A camera 20 is modeled as a pinhole camera in which the center of the camera 20 is positioned at C.

In order to calibrate the system 100, a reference phase of the reference plane mirror 1 is first measured, and then measurement is performed by positioning a measurement object at the same position. The reference phase of the reference plane mirror 1 is measured only once for the purpose of the calibration of the system 100.

To simplify the explanation of the calibration of the system 100, the reference plane mirror 1 and the measurement object are indicated at the same position as shown in FIG. 2. In the actual measurement process, the reference plane mirror 1 and the measurement object are measured separately. A line PC connecting a pixel position of the camera 20 P and the center of a pinhole of the camera 20 C intersects with $M(x_m, y_m, z_m)$ and $N(x_n, y_n, 0)$ on the measurement object and the reference plane mirror 1, respectively. From this, surface slopes at M and N are expressed as the following equations 7 and 8.

$$x_M = \frac{\pm\frac{1}{\sqrt{1+k_o^2+1/\alpha_y^2}} \pm \frac{1}{\sqrt{1+k_c^2+1//\gamma_x^2}}}{\frac{1}{\sqrt{\alpha_x^2+\alpha_y^2+1}} + \frac{1}{\sqrt{\gamma_x^2+\gamma_y^2+1}}},$$

$$y_M = \frac{\pm\frac{1}{\sqrt{1+1/k_o^2+1/\alpha_y^2}} \pm \frac{1}{\sqrt{1+1/k_c^2+1/\gamma_y^2}}}{\frac{1}{\sqrt{\alpha_x^2+\alpha_y^2+1}} + \frac{1}{\sqrt{\gamma_x^2+\gamma_y^2+1}}}$$

[Equation 7]

$$x_N = \frac{\pm\frac{1}{\sqrt{1+k_b^2+1/\beta_x^2}} \pm \frac{1}{\sqrt{1+k_{ax}^2+1/\gamma_{ax}^2}}}{\frac{1}{\sqrt{\beta_x^2+\beta_y^2+1}} + \frac{1}{\sqrt{\gamma_{ax}^2+\gamma_{ay}^2+1}}},$$

$$y_N = \frac{\pm\frac{1}{\sqrt{1+1/k_b^2+1/\beta_y^2}} \pm \frac{1}{\sqrt{1+1/k_{ax}^2+1/\gamma_{ay}^2}}}{\frac{1}{\sqrt{\beta_x^2+\beta_y^2+1}} + \frac{1}{\sqrt{\gamma_{ax}^2+\gamma_{ay}^1+1}}}$$

[Equation 8]

Herein,
[Equation 9] is as follows, $$\alpha_x = \frac{x_m - x_a}{z_a - z_m}, \alpha_y = \frac{y_m - y_a}{z_a - z_m}, \gamma_x = \frac{x_m - x_c}{z_c - z_m},$$

$$\gamma_y = \frac{y_m - y_c}{z_c - z_m}, k_a = \frac{\alpha_y}{\alpha_x}, k_c = \frac{\gamma_c}{\gamma_x}$$

[Equation 10] is as follows, $$\beta_x = \frac{x_n - x_{bo}}{z_{bo} - z_n}, \beta_y = \frac{y_n - y_{bo}}{z_{bo} - z_n}, \gamma_{ax} = \frac{x_n - x_c}{z_c - z_n},$$

$$\gamma_{ay} = \frac{y_n - y_c}{z_c - z_n}, k_b = \frac{\beta_y}{\beta_x}, k_{oc} = \frac{\gamma_{ay}}{\gamma_{ax}}$$

Since the reference plan mirror 1 is assumed to be a perfect plane, both the surface gradient component, $x_N$ and $y_N$, become 0. Consequently, the following equation 11 holds true.

$$\frac{1}{\sqrt{1+k_{oc}^2+1/\gamma_{ox}^2}} = \mp\frac{1}{\sqrt{1+k_b^2+1/\beta_x^2}},$$

$$\frac{1}{\sqrt{1+1/k_{oc}^2+1/\gamma_{oy}^2}} = \mp\frac{1}{\sqrt{1+1/k_b^2+1/\beta_y^2}}$$

[Equation 11]

Figure 3:
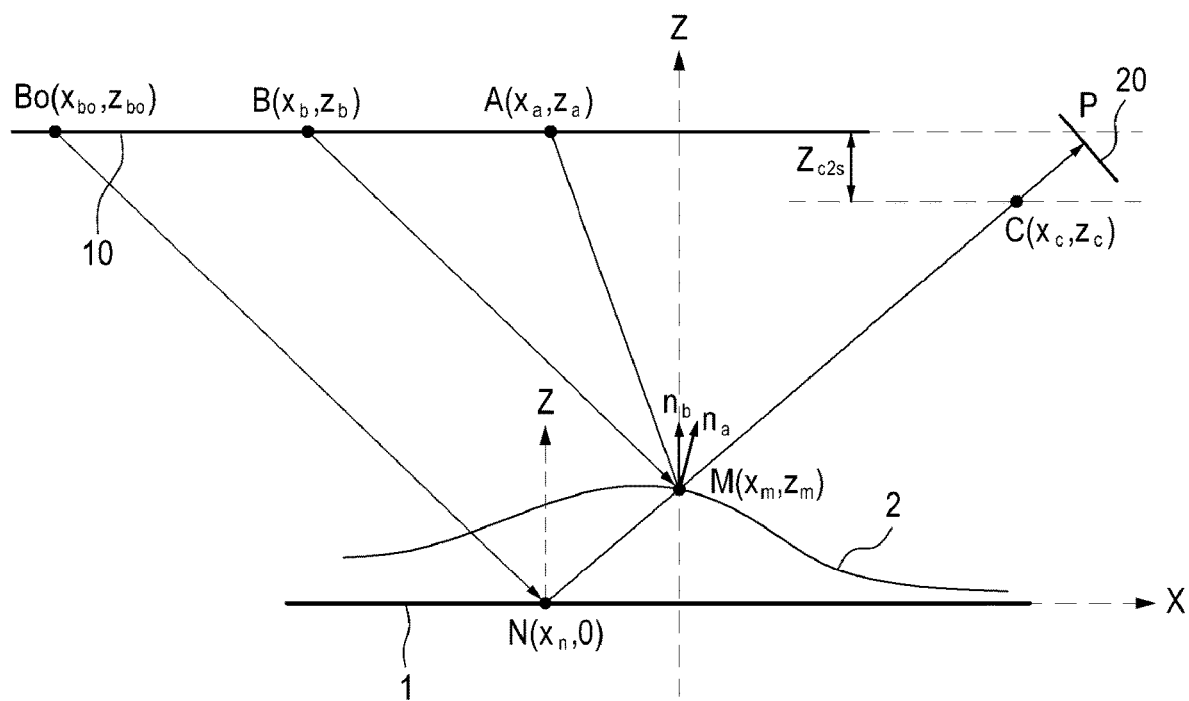
FIG. 3 is a schematic view of a XY plane shown in FIG. 2.

FIG. 3 is a schematic view of a XY plane shown in FIG. 2. After concisely representing FIG. 2 on the XZ plane, as shown in FIG. 3, when it is considered that the reference plane mirror 1 is positioned at a position corresponding to a measurement object M, the corresponding position on a screen 10 becomes B($X_b$,$Z_b$). From this, the geometric position relationship, as shown in the following equation 12, is established.

$$\left|\frac{x_n - x_{ba}}{z_{ba} - z_n}\right| = \left|\frac{x_m - x_b}{z_b - z_m}\right| = \left|\frac{x_n - x_c}{z_c - z_n}\right| = \left|\frac{x_m - x_c}{z_c - z_m}\right|,$$

$$|\beta_x| = |\gamma_{ax}| = |\gamma_x|, |\beta_y| = |\gamma_{ay}| = |\gamma_y|, |k_b| = |k_{ac}| - |k_c|$$

[Equation 12]

From equations 7, 11 and 12, the formula for surface slope can be derived as the following equation 13.

$$x_M = \frac{\pm\frac{1}{\sqrt{1+k_a^2+1/\alpha_x^2}} \mp \frac{1}{\sqrt{1+k_b^2+1/\beta_x^2}}}{\frac{1}{\sqrt{\alpha_x^2+\alpha_y^2+1}} + \frac{1}{\sqrt{\beta_x^2+\beta_y^2+1}}},$$

$$y_M = \frac{\pm\frac{1}{\sqrt{1+1/k_a^2+1/\alpha_y^2}} \mp \frac{1}{\sqrt{1+1/k_b^2+1/\beta_y^2}}}{\frac{1}{\sqrt{\alpha_x^2+\alpha_y^2+1}} + \frac{1}{\sqrt{\beta_x^2+\beta_y^2+1}}}$$

[Equation 13]

Furthermore, from equations 9, 10 and 12, the relationship between α and β can be expressed as shown in the following equation 14 or 15.

$$\alpha_x - \beta_x = \frac{x_a - x_b}{z_m - z_a} = \frac{x_a - x_b}{z_m - z_b} = \frac{x_a - x_b}{z_m - z_{m2s}},$$

[Equation 14]

$$\alpha_y - \beta_y = \frac{y_a - y_b}{z_m - z_a} = \frac{y_a - y_b}{z_m - z_b} = \frac{x_a - x_b}{z_m - z_{m2s}}$$

$$\alpha_x = \beta_x + \frac{x_a - x_b}{z_m - z_{m2s}}, \alpha_y = \beta_y + \frac{y_a - y_b}{z_m - z_{m2s}}$$

[Equation 15]

Herein, $z_{m2s}$ represents the distance in the z axis direction between the screen 10 and the reference plane mirror 1, both of which are positioned parallel to the x axis. Therefore, $z_a = z_b = z_{m2s}$.

Since the pixel position of the screen 10 is directly associated with phase information and thus is in linear proportion, it can be represented by the following equation 16.

$$x_a - x_b = \frac{s_p(\varphi_{ax} - \varphi_{bx})X_{screen}}{2\pi p_s},$$

[Equation 6]

$$y_a - y_b = \frac{s_p(\varphi_{ay} - \varphi_{by})Y_{screen}}{2\pi p_y}$$

Herein, $X_{screen}$ and $Y_{screen}$ Represent the size of the screen (10) in the X-direction and Y-direction, respectively, expressed in pixels. $p_x$ and $p_y$ represent the number of fringed patterns in the X-direction and Y-direction. $s_p$ represents the size of the pixel in the screen 10. $\varphi_{ax}$ and $\varphi_{ay}$ represent the phase in the X-direction and Y-direction, respectively, of the acquired measurement object. $\varphi_{bx}$ and $\varphi_{by}$ represent the phase in the X-direction and Y-direction, respectively, obtained when the reference plane mirror 1 is positioned at the position of the measurement object M. Herein, four parameters to be calibrated through measurement are $\beta_x$, $\beta_y$, $\varphi_{bx}$, and $\varphi_{by}$.

Figure 4:
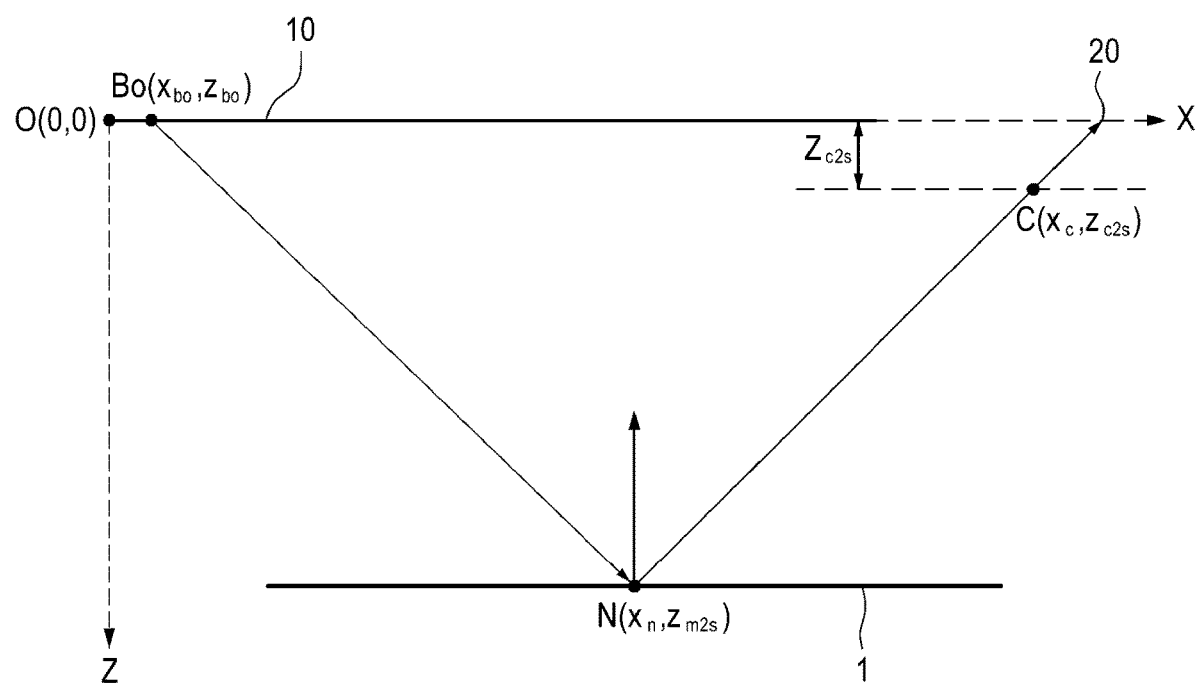
FIG. 4 shows a schematic view of the XY plane in order to explain a calibration method of β in FIG. 3, wherein the screen's far-left position is set as the origin (0,0) in this configuration.

FIG. 4 shows a schematic view of the XY plane in order to explain a calibration method of β in FIG. 3, wherein the screen's far-left position is set as the origin (0,0) in this configuration.

As shown in FIG. 4, to facilitate understanding, a measurement object has been removed from the diagram, as a β value is only associated with a reference plane mirror 1. When the left corner part of a screen 10 is set as two-dimensional coordinates with the origin (0,0), using a physical measurement tool with a precision at the micro-meter level, the distances in the X axis direction and the Y axis direction from the center point of a camera 20 C to the origin O are measured, denoted as $x_c$ and $y_c$, respectively. Similarly, the distance in the Z axis direction from the screen (10) to a reference plane mirror 1 and the camera 20 is measured, denoted as $z_{m2s}$ and $z_{c2s}$, respectively. Then, $\beta_x$ and $\beta_y$ can be easily calculated using equation 17 as shown below.

$$\beta_x = \frac{x_c - x_{bo}}{2z_{m2s} - z_{c2s}}, \beta_y = \frac{y_c - y_{bo}}{2z_{m2s} - z_{c2s}} \quad \text{[Equation 17]}$$

Herein,
[Equation 18] is as follows, $$x_{bo} = \frac{s_p(\varphi_{box} - \varphi_{x\_offset})X_{screen}}{2\pi p_x}, y_{bo} = \frac{s_p(\varphi_{boy} - \varphi_{y\_offset})Y_{screen}}{2\pi p_y}$$

$\varphi_{box}$ and $\varphi_{boy}$ are the initial relative values obtained when performing calibration method. To convert them into absolute values, it is necessary to add arbitrary offset values, $\varphi_{x\_offset}$ and $\varphi_{y\_offset}$. To calculate theses offset values, it is necessary to perform a three-step process called pixel matching, as described below.

In the first step, a bright dot is marked on a specific screen pixel position $S(X_{sp}, Y_{sp})$. Each phase of this pixel in the X axis direction and Y axis direction is represented as $\varphi_{spx}$, $\varphi_{spy}$, respectively.

In the second step, an image of the bright dot reflected onto the reference plane mirror 1 is stored through the camera 20.

In the third step, a position of the bright dot within the image of the camera 20 is determined and identified and a phase at this moment is represented as $\varphi_{cpx}$ and $\varphi_{cpy}$.

By measuring the difference in phases obtained through the above process, a phase offset of the X axis direction and a phase offset of the Y axis direction can be calculated by the following equations 19 and 20:

$$\varphi_{x\_offset} = \varphi_{spx} - \varphi_{cpx} = 2\pi f_x x_{cp} - \varphi_{cpx} \quad \text{[Equation 19]}$$

$$\varphi_{y\_offset} = \varphi_{spy} - \varphi_{cpy} = 2\pi f_y x_{cp} - \varphi_{cpy} \quad \text{[Equation 20]}$$

Using the geometric relationship between Bo and B, phase values, $\varphi_{bx}$ and $\varphi_{by}$, at the position B can be calculated as follows, $$\varphi_{bx} = \frac{x_b 2\pi p_x}{s_p X_{screen}} - \varphi_{x\_offset}, \varphi_{by} = \frac{y_b 2\pi p_y}{s_p Y_{screen}} - \varphi_{y\_offset} \quad \text{[Equation 21]}$$

Herein, $x_b = x_{bo} + 2\beta_x z_m, y_b = y_{bo} + 2\beta_y z_m$.

Description of Embodiments

Figure 5:
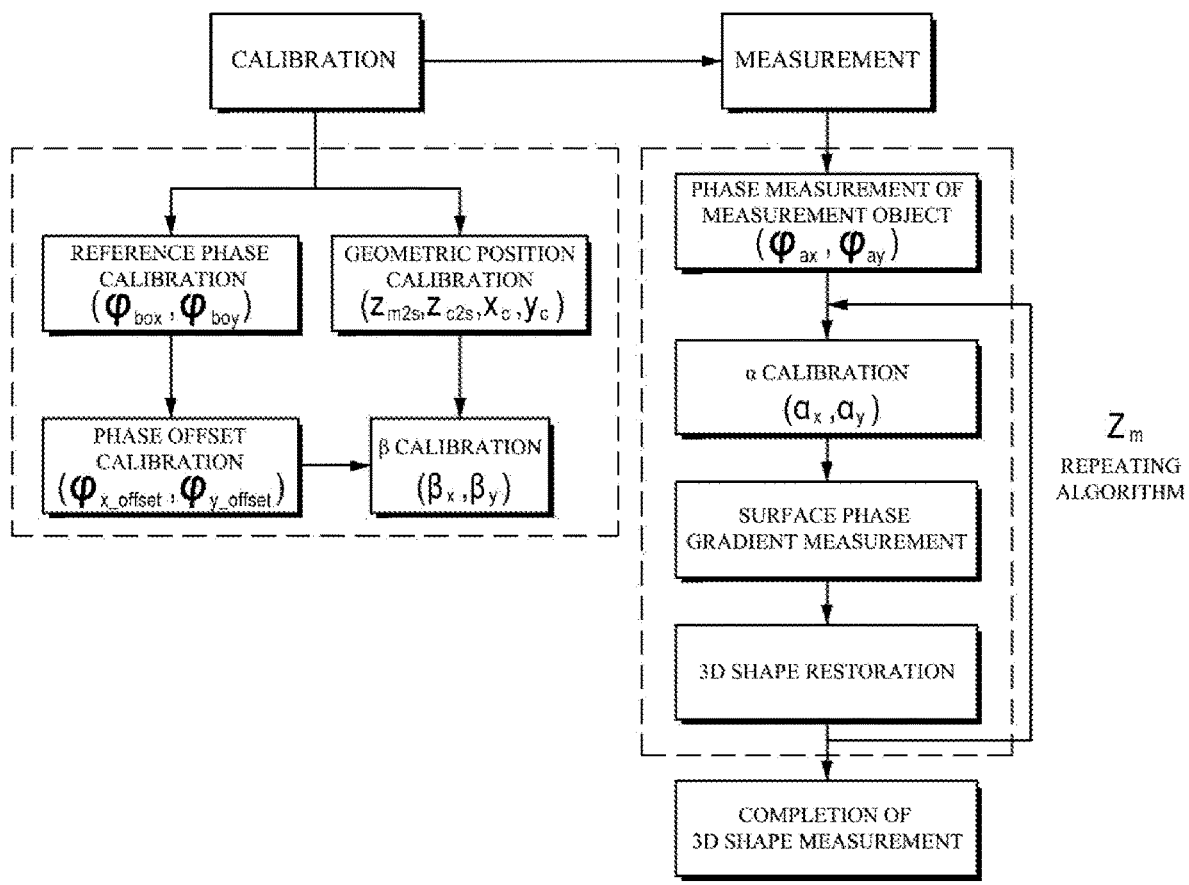
FIG. 5 shows a flowchart of a calibration method of deflectometry for improving measurement accuracy according to an embodiment of the present disclosure.

FIG. 5 shows a flowchart of a calibration method of deflectometry for improving measurement accuracy according to an embodiment of the present disclosure. A summarized representation of the measurement process up to now can be shown as FIG. 5.

In the initial calibration step performed only once, the reference phase ($\varphi_{box}, \varphi_{boy}$), offset phases ($\varphi_{x\_offset}, \varphi_{y\_offset}$), and geometric position variables ($z_{m2s}, z_{c2s}, x_c, y_c$) are measured to calculate the $\beta$ values ($\beta_x, \beta_y$).

Then, the $\alpha$ values ($\alpha_x, \alpha_y$) are calculated using the phase values ($\varphi_{ax}, \varphi_{ay}$) obtained from the measured object and equation 15.

At this time, $z_m$ is the only unknown variable included in equations 14 and 15, which are the calibration equation for these a and $\beta$ values, ($\alpha_x, \alpha_y$) and ($\beta_x, \beta_y$).

The initial value of 0 is assigned, and through each iteration process, a converged value of $z_m$ is measured. As the number of iteration steps increases, the accuracy of the measurement improves.

That is, in equation 15, by setting the initial value of $z_m$ to 0, $\alpha_x$ and $\alpha_y$ are calculated. After analyzing the gradient components and the three-dimensional shape of the measurement object, the process of iteratively calculating $z_m$ is repeated to measure the converged value of $z_m$.

In other words, in the calibration step, prior to performing the measurement process, calibration parameters ($\varphi_{box}, \varphi_{boy}, \varphi_{x\_offset}, \varphi_{y\_offset}, z_{m2s}, x_c, y_c$) are measured in advance and then stored. Then, the three-dimensional shape is restored by performing measurements of the phase values ($\varphi_{ax}, \varphi_{ay}$) and a values ($\alpha_x, \alpha_y$) for the measurement object through the measurement process, and undergoing iterative processes.

The invention claimed is:

1. In a shape measurement system, a deflectometry system for improving measurement accuracy comprising:
    a reference plane mirror that is positioned on an X-Y plane and has a plane shape parallel to the X-Y plane, in an X-Y-Z coordinated system;
    a measurement object that is positioned on the X-Y plane;
    a screen that generates a pattern and projects the pattern onto the measurement object or the reference plane mirror;
    a detector that obtains an image of a deformed pattern reflected from the measurement object and an image of a pattern reflected from the reference plane mirror;
    a phase acquisition portion that obtains a phase of the measurement object and obtains a phase of the reference plane mirror;
    a gradient calculation portion that computes an X-direction gradient component and computes a Y-direction gradient component; and
    an analysis unit that analyzes a three-dimensional shape of the measurement object based on the X-direction gradient component and the Y-direction gradient component, wherein
    prior to measuring the phase of the measurement object, $\beta$ is calibrated based on the phase of the reference plane mirror; and
    after measuring the phase of the measurement object, $\alpha$ is calibrated based on the $\beta$ to compute the gradient component.

2. The deflectometry system for improving measurement accuracy of claim 1, wherein
    the X-direction gradient component and the Y-direction gradient component are computed based on the following equation 1:

$$x_{slope} = \frac{\pm\frac{1}{\sqrt{1+k_s^2+1/\alpha_x^2}} \pm \frac{1}{\sqrt{1+k_e^2+1/\gamma_x^2}}}{\frac{1}{\sqrt{\alpha_x^2+\alpha_y^2+1}} + \frac{1}{\sqrt{\gamma_x^2+\gamma_y^2+1}}}, \quad \text{[Equation 4]}$$

-continued $$y_{slope} = \frac{\pm\dfrac{1}{\sqrt{1+1/k_s^2+1/\alpha_y^2}} \pm \dfrac{1}{\sqrt{1+1/k_e^2+1/\gamma_y^2}}}{\dfrac{1}{\sqrt{\alpha_x^2+\alpha_y^2+1}}+\dfrac{1}{\sqrt{\gamma_x^2+\gamma_y^2+1}}}.$$

3. The deflectometry system for improving measurement accuracy of claim 2, wherein
the calibration of β is calculated from the phase of the reference plane mirror, geometric position information among the screen, the reference plane mirror and the director, and phase offsets.

4. The deflectometry system for improving measurement accuracy of claim 3, wherein
the geometric position information among the respective components (screen, reference plane mirror, director) has a Z axis direction distance ($Z_{m2s}$) between the screen and the reference plane mirror, Z axis direction distance ($Z_{c2s}$) between the screen and the detector, an X axis direction distance ($X_c$), and a Y axis direction distance ($Y_c$).

5. The deflectometry system for improving measurement accuracy of claim 4, wherein
when marking a bright dot on a specific screen pixel position $S(X_{sp}, Y_{sp})$, followed by: representing each phase of this pixel in the X axis direction and Y axis direction as $\varphi_{spx}, \varphi_{spy}$, respectively; storing an image of the bright dot reflected onto the reference plane mirror through the detector; determining and identifying a position of the bright dot within the detector image; and representing a phase at this moment as $\varphi_{cp}, \varphi_{cpy}$,
a phase offset of the X axis direction and a phase offset of the Y axis direction are calculated by the following equations 19 and 20:

$$\varphi_{x\_offset}=\varphi_{spx}-\varphi_{cpx}=2\pi f_x x_{cp}-\varphi_{cpx} \quad \text{[Equation 19]}$$

$$\varphi_{y\_offset}=\varphi_{spy}-\varphi_{cpy}=2\pi f_y x_{cp}-\varphi_{cpy} \quad \text{[Equation 20]}.$$

6. The deflectometry system for improving measurement accuracy of claim 5, wherein
phases of X-direction and Y-direction, which are obtained when positioning the reference plane mirror at a position of the measurement object based on the phase offset of the Y axis direction and the offset of Y axis direction, are calculated by the following equation 21:

$$\varphi_{bx}=\frac{x_b 2\pi p_x}{s_p X_{screen}}-\varphi_{x\_offset},\ \varphi_{by}=\frac{y_b 2\pi p_y}{s_p Y_{screen}}-\varphi_{y\_offset}. \quad \text{[Equation 21]}$$

7. The deflectometry system for improving measurement accuracy of claim 6, wherein
$\beta_x$ and $\beta_y$ are calculated by the following equations 17 and 18:

$$\beta_x = \frac{x_c - x_{bo}}{2z_{m2s}-z_{c2s}},\ \beta_y = \frac{y_c - y_{bo}}{2z_{m2s}-z_{c2s}} \quad \text{[Equation 17]}$$

$$x_{bo}=\frac{s_p(\varphi_{box}-\varphi_{x\_offset})X_{screen}}{2\pi p_x}, \quad \text{[Equation 18]}$$

$$y_{bo}=\frac{s_p(\varphi_{boy}-\varphi_{y\_offset})Y_{screen}}{2\pi p_y}.$$

8. The deflectometry system for improving measurement accuracy of claim 7, wherein
$\alpha_x$ and $\alpha_y$ are calculated by the following equations 15 and 16:

$$\alpha_x = \beta_x + \frac{x_a - x_b}{z_m - z_{m2s}},\ \alpha_y = \beta_y + \frac{y_a - y_b}{z_m - z_{m2s}} \quad \text{[Equation 15]}$$

$$x_a - x_b = \frac{s_p(\varphi_{ax}-\varphi_{bx})X_{screen}}{2\pi p_s}, \quad \text{[Equation 16]}$$

$$y_a - y_b = \frac{s_p(\varphi_{ay}-\varphi_{by})Y_{screen}}{2\pi p_y}.$$

9. The deflectometry system for improving measurement accuracy of claim 8, wherein
a converged value of $z_m$ is measured by repeating the following process, which involves setting the initial value of $z_m$ in Equation 15 to 0, calculating $\alpha_x$ and $\alpha_y$, analyzing the gradient component and a three-dimensional shape of the measurement object, and then calculating $z_m$.

10. A calibration method of deflectometry for improving measurement accuracy comprising steps of:
S1: in a screen X-Y-Z coordinate system that generates a pattern, the pattern is projected onto a reference plane mirror positioned on the X-Y plane, a detector obtains an image of a deformed pattern reflected from the reference plane mirror, and then a phase acquisition portion obtains a phase of the reference plane mirror;
S2: the phase acquisition portion calibrates β based on the phase of the reference plane mirror as a basis;
S3: a measurement object is position on the X-Y plane, a screen projects the pattern onto the measurement object, and the detector obtains an image of a deformed pattern reflected from the measurement object;
S4: α is calibrated based on the β;
S5: a gradient calculation portion computes an X-direction gradient component and a Y-direction gradient component; and
S6: an analysis unit analyzes a three-dimensional shape of the measurement specimen based on the X-direction gradient component and the Y-direction gradient component.

11. The calibration method of deflectometry for improving measurement accuracy of claim 10, wherein
in S5, the X-direction gradient component and the Y-direction gradient component are computed by the following equation 4:

$$x_{slope} = \frac{\pm\dfrac{1}{\sqrt{1+k_s^2+1/\alpha_x^2}} \pm \dfrac{1}{\sqrt{1+k_e^2+1/\gamma_x^2}}}{\dfrac{1}{\sqrt{\alpha_x^2+\alpha_y^2+1}}+\dfrac{1}{\sqrt{\gamma_x^2+\gamma_y^2+1}}}, \quad \text{[Equation 4]}$$

$$y_{slope} = \frac{\pm\dfrac{1}{\sqrt{1+1/k_s^2+1/\alpha_y^2}} \pm \dfrac{1}{\sqrt{1+1/k_e^2+1/\gamma_y^2}}}{\dfrac{1}{\sqrt{\alpha_x^2+\alpha_y^2+1}}+\dfrac{1}{\sqrt{\gamma_x^2+\gamma_y^2+1}}}.$$

12. The calibration method of deflectometry for improving measurement accuracy of claim 11, wherein
in S2, a phase of the reference plane mirror, calibration of the β is calculated from geometric position information among respective components (screen, reference plane mirror, detector) and phase offsets;

the geometric position information among the respective components (screen, reference plane mirror, detector) has a Z axis direction distance ($Z_{m2s}$) between the screen and the reference plane mirror, Z axis direction distance ($Z_{c2s}$) between the screen and the detector, an X axis direction distance ($X_c$), and a Y axis direction distance ($Y_c$); and when marking a bright dot on a specific screen pixel position $S(X_{sp}, Y_{sp})$, followed by: representing each phase of this pixel in the X axis direction and Y axis direction as $\varphi_{spx}$, $\varphi_{spy}$, respectively; storing an image of the bright dot reflected onto the reference plane mirror through the detector; determining and identifying a position of the bright dot within the detector image; and representing a phase at this moment as $\varphi_{cpx}$, $\varphi_{cpy}$, a phase offset of the X axis direction and a phase offset of the Y axis direction are calculated by the following equations 19 and 20:

$$\varphi_{x\_offset}=\varphi_{spx}-\varphi_{cpx}=2\pi f_x x_{cp}-\varphi_{cpx} \quad \text{[Equation 19]}$$

$$\varphi_{y\_offset}=\varphi_{spy}-\varphi_{cpy}=2\pi f_y x_{cp}-\varphi_{cpy} \quad \text{[Equation 20]}.$$

13. The calibration method of deflectometry for improving measurement accuracy of claim 12, wherein phases of X-direction and Y-direction, which are obtained when positioning the reference plane mirror at a position of the measurement object based on the phase offset of the Y axis direction and the offset of Y axis direction, are calculated by the following equation 21:

$$\varphi_{bx}=\frac{x_b 2\pi p_x}{s_p X_{screen}}-\varphi_{x\_offset}, \varphi_{by}=\frac{y_b 2\pi p_y}{s_p Y_{screen}}-\varphi_{y\_offset}; \quad \text{[Equation 21]}$$

and $\beta_x$ and $\beta_y$ are calculated by the following equations 17 and 18:

$$\beta_x = \frac{x_c - x_{bo}}{2z_{m2s}-z_{c2s}}, \beta_y = \frac{y_c - y_{bo}}{2z_{m2s}-z_{c2s}} \quad \text{[Equation 17]}$$

$$x_{bo} = \frac{s_p(\varphi_{box}-\varphi_{x\_offset})X_{screen}}{2\pi p_x}, \quad \text{[Equation 18]}$$

$$y_{bo} = \frac{s_p(\varphi_{boy}-\varphi_{y\_offset})Y_{screen}}{2\pi p_y}.$$

14. The calibration method of deflectometry for improving measurement accuracy of claim 13, wherein in S4, $\alpha_x$ and $\alpha_y$ are calculated by the following equations 15 and 16:

$$\alpha_x = \beta_x + \frac{x_a - x_b}{z_m - z_{m2s}}, \alpha_y = \beta_y + \frac{y_a - y_b}{z_m - z_{m2s}} \quad \text{[Equation 15]}$$

$$x_a - x_b = \frac{s_p(\varphi_{ax}-\varphi_{bx})X_{screen}}{2\pi p_s}, \quad \text{[Equation 16]}$$

$$y_a - y_b = \frac{s_p(\varphi_{ay}-\varphi_{by})Y_{screen}}{2\pi p_y}.$$

15. The calibration method of deflectometry for improving measurement accuracy of claim 14, wherein a converged value of $z_m$ is measured by repeating the following process, which involves setting the initial value of $z_m$ in Equation 15 to 0, calculating $\alpha_x$ and $\alpha_y$, measuring $z_m$ via S5 and S7, and then recalculating $\alpha_x$ and $\alpha_y$.

16. A recording medium in which a computer program that performs a calibration method according to claim 10 is recorded.

* * * * *